United States Patent [19]
Hennequin

[11] 3,953,816
[45] Apr. 27, 1976

[54] POSITION DETECTING SYSTEM

[75] Inventor: Jacques Michel Hennequin, St Maurice, France

[73] Assignee: Compagnie (Societe) Anonyme, Paris, France

[22] Filed: Oct. 1, 1973

[21] Appl. No.: 402,548

[30] Foreign Application Priority Data
Oct. 10, 1972  France .................. 72.35824

[52] U.S. Cl. .................. 336/119; 336/129
[51] Int. Cl.² .................. H01F 21/04
[58] Field of Search .......... 336/129, 122, 123, 200, 336/115, 117, 130, 119; 340/196, 199

[56]   References Cited
       UNITED STATES PATENTS

| | | | |
|---|---|---|---|
| 2,915,721 | 12/1959 | Farrard et al. | 336/123 X |
| 3,202,948 | 8/1965 | Farrard | 336/123 X |
| 3,264,588 | 8/1966 | Winget | 336/123 X |
| 3,522,568 | 8/1970 | Hasbrouck | 336/129 X |
| 3,668,587 | 6/1972 | Foster | 336/129 X |
| 3,732,513 | 5/1973 | Farrard | 336/200 X |
| 3,772,587 | 11/1973 | Farrard et al. | 336/129 X |

Primary Examiner—Thomas J. Kozma
Attorney, Agent, or Firm—Diller, Brown, Ramik & Wight

[57]   ABSTRACT

A position detecting system includes a sending unit in the form of a continuous conductor describing a Greek key pattern surrounded by a return-path conductor arrangement. The return-path conductor is so arranged as to provide additional legs of the pattern with the widths and spacings of such additional legs with respect to adjacent legs of the pattern being such as to assure a magnetic effect producing well defined and evenly spaced node and antinode signals in an associated pick-up head.

6 Claims, 9 Drawing Figures

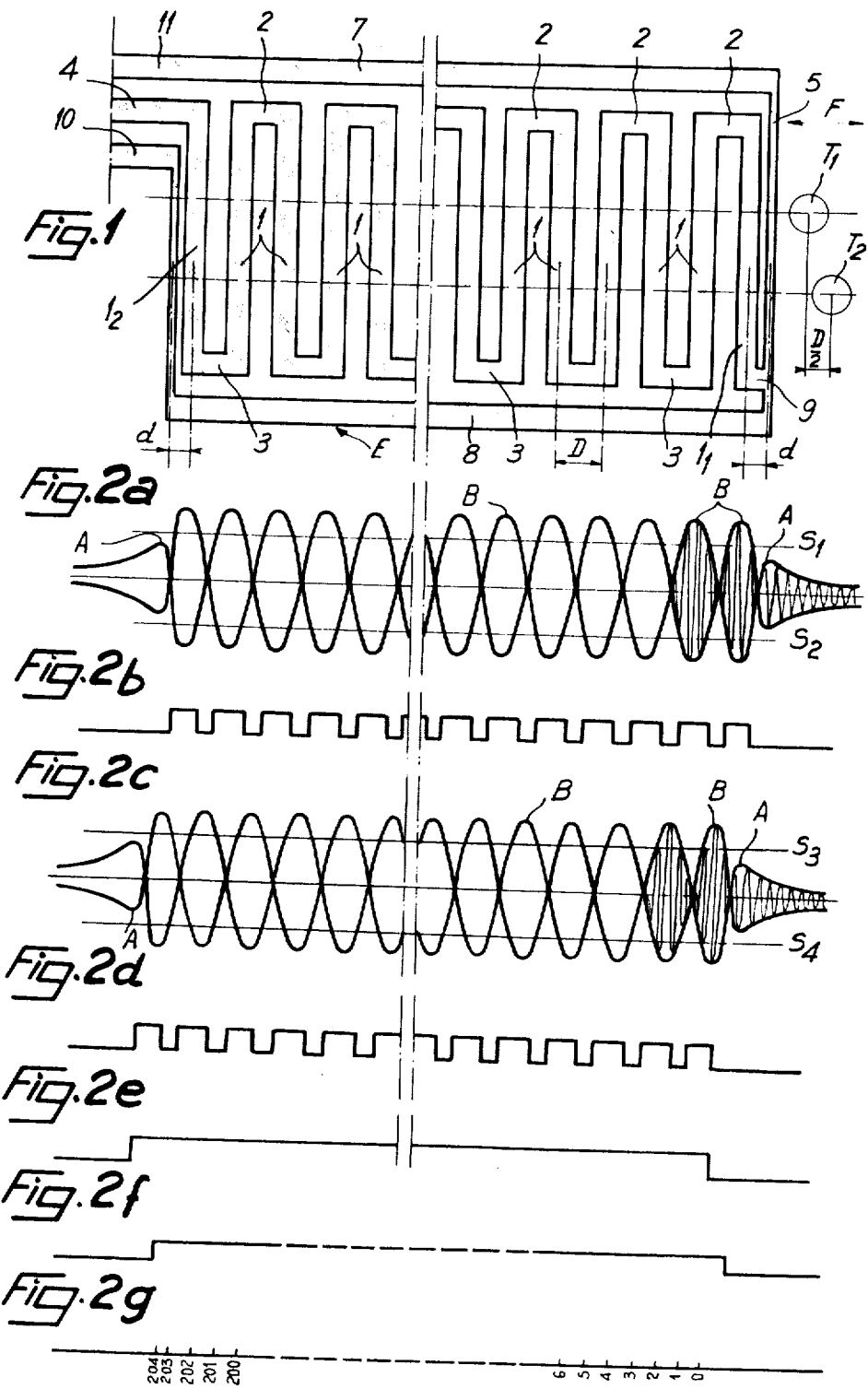

POSITION DETECTING SYSTEM

BACKGROUND OF THE INVENTION

The present invention concerns a position detector system including a transmitter or sending unit consisting of a circuitous conductor. Such position detecting systems are already known and are used for example accurately to position magnetic read and write heads in relation to desired disk-memory tracks.

In the known detectors, the sending means consists usually of a flat continuous conductor arranged in a Greek key pattern presenting transverse, rectilinear parallel sections which are equidistantly spaced and are connected end-to-end at alternate sides of the center line of the pattern by longitudinal conductor sections. Such a conductor, best produced in the form of a printed circuit, is used to carry an alternating current at a frequency of for example 1 MHz, in order to produce an essentially regular pattern of magnetic fields. A pick-up means in the form of at least one magnetic receiver head is moved along a path parallel to the center line of the pattern so as to produce alternate nodes and antinodes at regular intervals dependent upon the disposition of the head relative to the legs of the pattern. More specifically, the signal which the pick-up means receives is modulated and forms a sequence of antinodes when it is perpendicular to the transverse sections and nodes when it is perpendicular to the spaces between said transverse sections. Suitable electronic means may be employed for utilizing a part of the envelope of this modulated signal to count its maxima (perpendicular to the transverse sections) and/or, most of all, the passages through zero (perpendicular to the spaces between said transverse sections). Thus due to this counting, it is possible to sense the number of transverse sections which pass under the receiving head thereby to ascertain the position of the pick-up means relative to the sending unit.

Prior art system ssuch as described above are subject, however, to certain disadvantages. In the first place, unless the transverse rectilinear sections of the Greek key are of considerable length which correspondingly increases the width of that Greek key, the receiving head is sensitive not only to the signal emitted by the transverse sections, but also to those emitted by the longitudinal sections. Consequently, the entire signal is disturbed and is no longer a regular sequence of envelopes and nodes.

A known technique is used by which it is relatively easy to avoid this first pitfall. Since the two groups of discontinuous longitudinal sections of the Greek key which are disposed at opposite sides of the pattern each have a total length equal to half the length of the Greek key, and since each carries the same current I as the transverse sections, the magnetic fields created by each group may be effectively compensated or neutralized by returning one-half the current along a conductor having a length equal to that of the Greek key and parallel to the longitudinal sections. Such a technique carried out in a known manner by establishing a return-path conductor around the Greek key in the form of a rectangular return conductor whose two sides are parallel to the transverse sections of said Greek key. Since the other two sides of the return-path conductor are parallel to the opposite end legs or longitudinal sections of the pattern, an electrical connection is established between one end leg of the Greek key and that side of the return-path conductor frame which is adjoining and parallel thereto. This connection is accomplished symmetrically with respect to the pattern by a longitudinal conductor whose axis is coincident with the longitudinal axis of the Greek key so that the return current splits at such connection and passes in opposite directions therefrom. In this way, the two return runs of the current having traversed the Greek key are identical lengths so that the current is split in half.

Another drawback of the aforesaid system stems from the fact that the amplitudes of the antinodes and the clear formation of the nodes are not uniform throughout the length of the pattern. That is to say, when the pick-up means is located in the central region of the pattern, it receives signals not only from the sending unit legs or patterns immediately near it but also from a number of transverse sections on either side thereof. Consequently, the pick-up means senses the resultant of a great number of signals so that the nodes and antinodes are well defined. When the pick-up means is close to an end of the Greek key, however, it receives a lesser number of signals in consequence of which the nodes in particular are not well defined. That is, the symmetry of the signals received is interrupted with the result that the pick-up means senses much more substantial antinodes and much less clear nodes than in the neighborhood of the center of the Greek key. It becomes difficult then, if not impossible, accurately to detect, and thus count, the nodes in the regions of the ends of the pattern.

A solution for remedying this inconvenience would be to provide a Greek key which is markedly longer than there is a need for and to use only the central portion of the pattern. However, this would increase the crowding of the detector.

BRIEF SUMMARY OF THE INVENTION

The present invention corrects the disadvantages specified above. According to the invention, a position detector system comprises a pick-up means having at least one magnetic head and sending means in the form of a Greek key pattern having a specially constructed return-path conductor associated therewith. The sending means comprises a flat, continuous conductor carrying an alternating current supplied by a feed source and describing a Greek key pattern which presents rectilinear transverse parallel sections, in regular distance from each other, linked by longitudinal sections positioned alternatingly on either side of said transverse sections. The return-path conductor is in the form of a rectangular frame conductor whose sides are parallel to the transverse and longitudinal sections respectively of the pattern, while electrical connection is established asymmetrically between a transverse end portion or leg of the Greek key and that side of the return conductor frame which is parallel to it. The Greek key and the return conductor frame are tied to the feeding source at their ends opposite such asymmetrical connection and relative movement between the pick-up means and sending means is effected along a path parallel to the center line of the pattern. That side of the return conductor frame which is asymmetrically connected to the corresponding end leg of the pattern is, in effect, an additional transverse section or leg of the Greek key. Furthermore, the spacing between the end leg of the pattern and such additional leg is less than the spacing between the transverse legs of the sending unit or pattern.

Thus, due to the fact that the aforesaid additional leg provided by the return-path conductor carries only half the current carried by the transverse sections or legs of the pattern and that the spacing between such additional or supplementary section and the end leg of the pattern is below normal, the result is that the amplitude of the antinode corresponding with such additional transverse section or leg may be made lower than that of the other antinodes so that the node which also corresponds to such additional leg as well as nodes corresponding to adjacent leg of the pattern may all be essentially uniform and well defined. The antinode, furthermore, corresponding with the end leg or transverse section of the pattern may be made identical with the antinodes of the other transverse sections of the pattern. To accomplish these effects it is absolutely necessary to adjust in each case, i.e., empirically, the distance between the supplementary transverse section and the extreme end of the transverse section of the pattern. A preferred manner of effecting this adjustment, notably in the case of large conductors, is to reduce the width of said supplementary transverse section formed by the return-path conductor. The same effect may be employed at that end of the Greek key which is connected to the feeding source. In this case, the corresponding side of the return conductor frame likewise forms an additional or supplementary transverse section or leg of the Greek key and, again, the spacing between this further additional section and the adjoining end leg of the Greek key may be less than the spacing between legs of the pattern. Likewise, the width of this further leg may also be adjusted as required.

The arrangement of the return-path conductor means and its connection with the end leg of the pattern are such that the two return paths for the current are approximately the same length whereby the current is split in half in returning.

BRIEF DESCRIPTION OF THE DRAWING FIGURES

FIG. 1 illustrates a position detecting system according to the invention;

FIGS. 2a to 2g illustrate certain waveforms and operations of the system shown in FIG. 1.

DETAILED DESCRIPTION OF THE INVENTION

Figure 3:
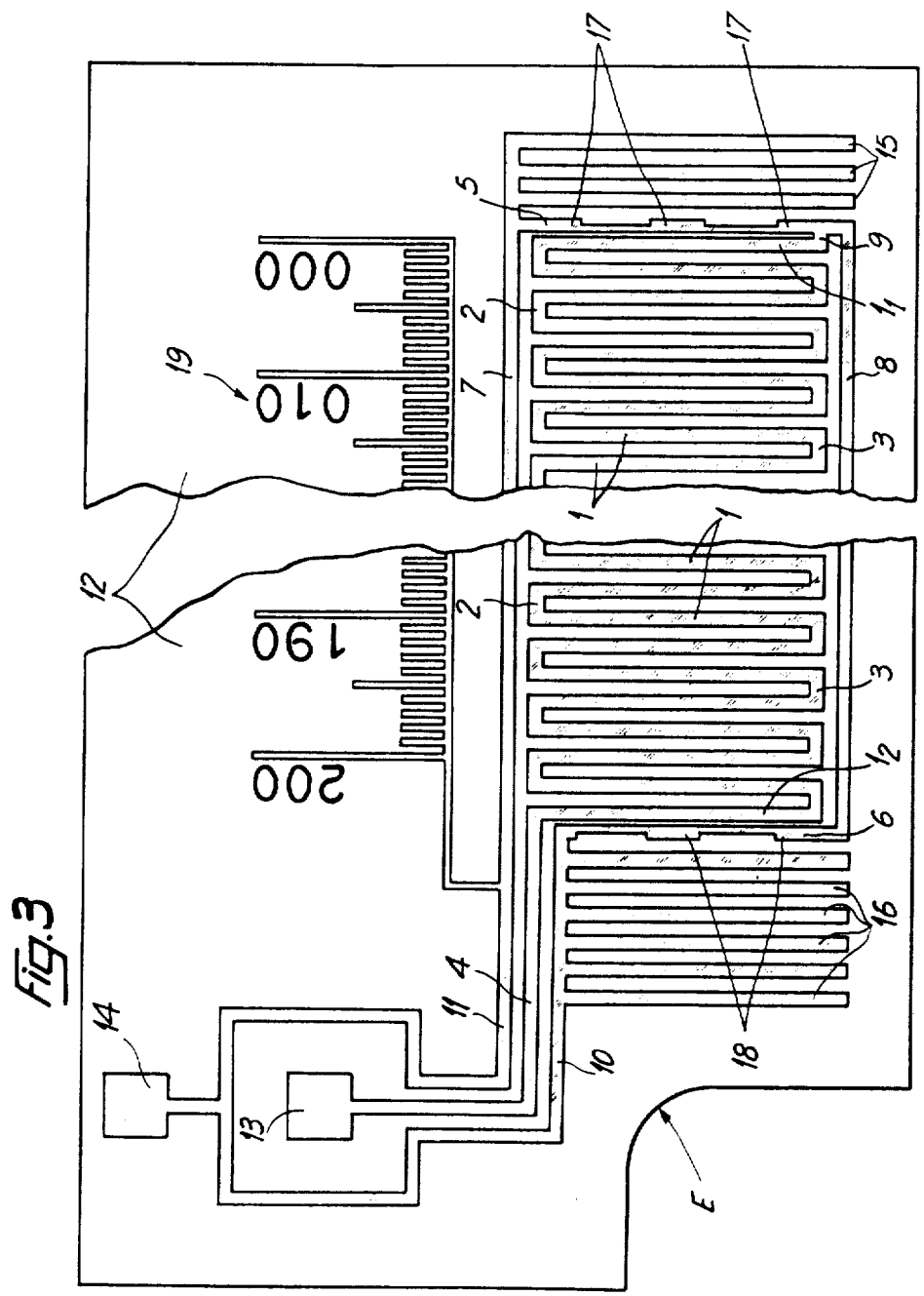
FIG. 3 illustrates an embodiment of the sending unit in the form of a printed circuit.

In the illustrative embodiment shown in FIG. 1, the sending means together with the return-path conductor is designated generally by the reference character E while the pick-up means is shown in the form of a receiver unit having two magnetic heads $T_1$ and $T_2$. The sending unit comprises a continuous conductive tape describing a Greek key pattern and presenting transverse, parallel legs or sections 1 disposed in equidistantly spaced relation to each other, such spacing being indicated by the reference character D. Corresponding ends of adjacent legs are connected at opposite sides of the pattern by longitudinal conductor sections 2 and 3 to complete the continuous conductor pattern. At one end of the Greek key a longitudinally extending conductor portion 4 is connected to one of the terminals of an alternating voltage source (not shown) while the ends 10 and 11 of the return-path conductor are connected to the other terminal of the source.

The Greek key pattern is surrounded by return-path conductor means in the form of a rectangular frame conductor comprising the end strips 5 and 6 parallel to the transverse legs 1 and the sides 7 and 8 parallel to the longitudinal sections or strips 2 and 3. That end leg $1_1$ which is at the end of the pattern opposite the connecting strip 4 is connected at its free end to the end strip conductor 5 by means of a connector strip 9 so that the electrical connection between the pattern and the return-path conductor means is effected asymmetrically or offset in relation to the longitudinal axis of the Greek key. As a result, the return-path conductor portion 5 operates as an additional transverse section or leg of the Greek key 1, 2, 3. As shown, the distance between the end leg or section $1_1$ and the additional leg 5 is selected equal to $d$, $d$ being less than D for purposes which will be apparent presently.

In similar fashion, at the other end of the sending unit, the end strip 6 of the return-path conductor extends parallel to the end leg $1_2$, is spaced therefrom by the distance $d$, and effectively forms an additional leg at that end of the unit. It will be noted that the end strips or additional legs 5 and 6 are narrower than the legs of the pattern, the purpose thereof being presently apparent. Preferably, the Greek key and the associated return-path conductor means 5, 6, 7, 8 are formed as a printed circuit on a suitable substrate or insulating support.

In the example shown in FIG. 1, the pick-up means consists of two magnetic heads $T_1$ and $T_2$ mounted on a common support so as to be rigidly connected and are staggered longitudinally in relation to each other by a distance D/2. The sending unit and pick-up unit are mounted for relative longitudinal movement back and forth as indicated by the arrow F parallel to the longitudinal axis or center line of the Greek key pattern such that the pick-up heads $T_1$ and $T_2$ may successively register one with a leg of the pattern and the other with the space between adjacent legs. Either unit may be fixed while the other is movable.

In operation, the A.C. source connected to the terminal strips 4, 10 and 11 causes instantaneous current flow in the same direction in all of the sections 2 and 3 while current flow in adjacent legs 1 is in opposite directions. The length of the return-path conductor portions 8, 6, 19 and that of the portions 5, 7, 11 are approximately the same so that the current is split in half at the connector strip 9. Thus, half the aforesaid instantaneous current will return along the side strips 7 and 8 in a direction opposite that of the current flow through the sections 2 and 3. Since the lengths of the portions 7 and 8 are substantially twice that of the corresponding sections 2 and 3, the magnetic fields along the opposite sides of the assembly are essentially compensated or neutralized. At the same time, one half the return current flows in each of the additional legs 5 and 6 in a direction opposite that of the full current flows in the legs $1_1$ and $1_2$.

When the receiving head $T_1$, moving toward the left in the FIG. 1 relative to the sending unit E, approaches the side 5, it emits a modulated signal (see FIG. 2a) whose amplitude grows and passes through a maximum when this head comes into registry with said side 5. When the head $T_1$ continues to advance in the direction of the section $1_1$, the amplitude of the modulated signal declines, passes through zero when said head is approximately in the middle of the space separating the side 5 and the section $1_1$, then grows anew to pass through a maximum when in registry with the latter. The same process is repeated when said head passes from the section $1_1$ to the following section and so on along the length of the sending unit. Thus, the envelope of the modulated signal forms an antinode of the amplitude A corresponding with the passing of the side 5 and the antinodes of the amplitude B, corresponding with the passing of the transverse sections $1_1$ and $1_2$ at the Greek key, said antinodes being separated by very clear nodes.

According to the invention, due to the fact that the current circulating in the side 5 is half of that circulating in the transverse section $1_1$ and the distance $d$ between the section $1_1$ and the side 5 is small, the amplitude A is less than that of the amplitude B. By proper selection of the distance $d$ and the width of the strip 5 it is possible to adjust the amplitude A so that the latter be a fraction of the amplitude B. In a particular case of setting up the invention, $d$ was chosen in such a way that the amplitude A was four-tenths the amplitude of B, all the signals B had the same amplitude and, consequently, the nodes were regularly distributed in the space. The strip 6 is similarly related to the leg $1_2$ so that the signals are symmetrical as the receiving head $T_1$ passes over the left-hand end of FIG. 1, see FIG. 2a. The signals associated with the receiving head $T_2$ are shown in FIG. 2c and are shifted in phase with respect to FIG. 2a by 180° due to the aforesaid longitudinal spacing D/2 between the heads. By employing the position detecting system to select or identify the tracks of a disk memory, it is possible to associate the head $T_1$ with the counting of even number tracks and to associate the head $T_2$ with the counting of odd number tracks.

The track O may be associated with the passing through zero of the signal of the head $T_1$ (FIGS. 2a and 2g) between the sections $1_1$ and $1_2$, while the other tracks 2, 4, 6, . . . 204, are associated with the passages through zero of said signal between the different consecutive transverse sections or legs 1. In the same manner, the track 1 may be associated with the zero passage of the signal of head $T_2$ (FIGS. 2c and 2g) between the sections $1_1$ and $1_2$, while the other tracks 3, 5, 7, . . . 203, are associated with the zero passages of said signal between the different consecutive transverse sections or legs 1.

The signals of the FIGS. 2a and 2c may be utilized to obtain control signals. Thus, suitable threshold circuits displaying the thresholds $S_1$, $S_2$, $S_3$, and $S_4$ (see FIGS. 2a and 2c) are connected to the heads $T_1$ and $T_2$ and by selecting these thresholds in such a manner that they be included between A and B, one may be processing of the signal of FIG. 2a obtain the signal of FIG. 2b. Similarly, the signal of FIG. 2d is obtained from the signal of FIG. 2c. By addition of these last signals, one may attain continuous signals indicating the amplitude of the relative "useful" displacement or position of the heads in relation to the sending unit E. Due to the flip-flop circuit the signal of the useful displacement (see FIG. 2e) associated with the displacement of the right toward the left of FIG. 1, begins only with the appearance of the signal of FIG. 2d. Similarly, for the same signal corresponding with the displacement from the left toward the right of FIG. 1, the signal of useful displacement (see FIG. 2f) begins only, due to a flip-flop circuit, with the appearance of the signal of FIG. 2b. The absence of this useful signal of displacement will have to be interpreted as an incident.

FIG. 3 shows a mode of practical embodiment of the sending unit E of the detector according to the invention. This sending unit is formed according to the technique of printed circuits by photogravure of a conductive layer, i.e., copper, carried on an insulating plate 12. In this version of design, one finds again the Greek key $1_1$, 1, $1_2$, 2, 3, the frame 5, 6, 7, 8 and the connections 4, 9, 10 and 11. The strip 4 is connected with a metallized area 13 while the connections 10 and 11 end in a common metallized zone 14. The source of alternating volage is connected between the metallized zones 13 and 14.

To prevent accidental deterioration of the sides 5 and 6 (i.e. by scratching) they are protected by a series of metallized transverse strips 15 and 16. Moreover, the sides 5 and 6 may be reinforced by the enlarged areas 17 and 18, respectively, arranged outside of the paths traversed by the heads $T_1$ and $T_2$. The plate 12 is provided with a gradation 19 offering a representation of the different tracks of a disk memory in relation to the transverse sections of the Greek key.

What is claimed is:

1. A position detecting system comprising, in combination:

pick-up means mounted for movement back and forth along a given path; and sending means located in spaced relation to and extending along the direction of said path for producing alternate nodes and antinodes in said pick-up means at spaced increments of movement of the latter along said path, said sending means comprising a conductor arranged in a Greek key pattern essentially symmetrical with respect to said path and presenting equidistantly spaced and parallel legs including opposite end legs, all of which legs are of equal widths, and a return-path conductor connected to one of said end legs adjacent the end thereof and at a point asymmetrical with respect to said path, said return-path conductor branching from said point of connection with one branch extending therefrom parallel to said one leg, said one branch being spaced from said one end leg by an amount less than the equidistant spacing between legs and being of a width less than the equal widths of said legs, the spacing between said one branch and said one end leg and the width of said one branch being coordinated to produce a clearly recognizable signal at said pick-up means when same is positioned thereover.

2. A position detecting system as defined in claim 1 wherein said opposite end legs extend in opposite directions and said return-path conductor includes a portion lying parallel to and spaced from the other end leg by an amount less than said equidistant spacing, said portion also being of a width less than said equal widths of the legs with the spacing between said portion and said other end leg and said width of said portion being coordinated to produce a clearly recognizable signal at said pick-up means when same is positioned thereover.

3. A position detecting system as defined in claim 1 wherein said pattern and said return-path conductor are formed as a printed circuit.

4. A position detecting system as defined in claim 2 wherein said pattern and said return-path conductor are formed as a printed circuit.

5. A position detecting system as defined in claim 4 including a plurality of spaced, parallel metal strips on said printed circuit beyond said one branch and said portion respectively.

6. A position detecting apparatus as defined in claim 5 wherein said printed circuit includes large, non-metallized areas respectively beyond said metal strips.

* * * * *